US009596446B2

(12) United States Patent
Bruls et al.

(10) Patent No.: US 9,596,446 B2
(45) Date of Patent: Mar. 14, 2017

(54) METHOD OF ENCODING A VIDEO DATA SIGNAL FOR USE WITH A MULTI-VIEW STEREOSCOPIC DISPLAY DEVICE

(71) Applicant: KONINKLIJKE PHILIPS N.V., Eindhoven (NL)

(72) Inventors: Wilhelmus Hendrikus Alfonsus Bruls, Eindhoven (NL); Meindert Onno Wildeboer, Eindhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/407,537

(22) PCT Filed: Jan. 27, 2014

(86) PCT No.: PCT/IB2014/058564
§ 371 (c)(1),
(2) Date: Dec. 12, 2014

(87) PCT Pub. No.: WO2014/122553
PCT Pub. Date: Aug. 14, 2014

(65) Prior Publication Data
US 2015/0334369 A1    Nov. 19, 2015

Related U.S. Application Data

(60) Provisional application No. 61/821,750, filed on May 10, 2013.

(30) Foreign Application Priority Data

Feb. 6, 2013   (EP) ..................................... 13154244
Feb. 6, 2013   (EP) ..................................... 13154257

(51) Int. Cl.
*H04N 13/00* (2006.01)
*H04N 13/04* (2006.01)

(52) U.S. Cl.
CPC ..... *H04N 13/0011* (2013.01); *H04N 13/0022* (2013.01); *H04N 13/0048* (2013.01); *H04N 13/0447* (2013.01); *H04N 2013/0081* (2013.01)

(58) Field of Classification Search
CPC ........... H04N 13/0048; H04N 13/0022; H04N 13/0447; H04N 13/0081
(Continued)

(56) References Cited

U.S. PATENT DOCUMENTS 8,345,751 B2    1/2013   Klein Gunnewiek et al.
8,487,983 B2*   7/2013   Nishioka ............ H04N 13/0022
                                               348/43
(Continued)

FOREIGN PATENT DOCUMENTS

EP    1617683 A1    1/2006
EP    2197217 A1    6/2010
(Continued)

OTHER PUBLICATIONS

Gunnewiek (Publication No. WO 2011/039679) of Gunnewiek (US 2012/0188341).*
(Continued)

*Primary Examiner* — Neil Mikeska (57) ABSTRACT

The present invention relates to a method of encoding a video data signal for use with a multi-view stereoscopic display device a method of decoding a video data signal, a video data signal, an encoder of a video data signal for use with a multi-view stereoscopic display device, a decoder of a video data signal, a computer program product comprising instructions for encoding a video data signal and a computer program product comprising instructions for decoding a video data signal. The method of encoding relates to a method of encoding a video data signal for use with a (Continued)

multi-view stereoscopic display device, the method comprising: providing a first image of a scene as seen from an input viewpoint, providing a depth map associated with the first image, providing preference data indicative of the preferred position of the center view for use in view rendering based on the first image and the depth map, the preferred position of the center view relating the input viewpoint to a base-line between a reference left view and a reference right view and generating the video data signal comprising encoded data representing the first image, the depth map and the preference data.

15 Claims, 4 Drawing Sheets

(58) Field of Classification Search
USPC .......................................................... 348/43
See application file for complete search history.

(56) References Cited

U.S. PATENT DOCUMENTS

| | | | |
|---|---|---|---|
| 8,767,046 | B2 | 7/2014 | Redert et al. |
| 2007/0058034 | A1* | 3/2007 | Numazaki .......... H04N 13/0404 348/51 |
| 2008/0309756 | A1* | 12/2008 | Verburgh ........... H04N 13/0011 348/51 |
| 2009/0195642 | A1* | 8/2009 | Fukushima ........ H04N 13/0404 348/51 |
| 2012/0188341 | A1* | 7/2012 | Klein Gunnewiek ........ H04N 13/0048 348/43 |
| 2012/0307357 | A1 | 12/2012 | Choi |

FOREIGN PATENT DOCUMENTS

| | | |
|---|---|---|
| WO | 2006137000 A1 | 12/2006 |
| WO | 2011039679 A1 | 4/2011 |
| WO | 2012007867 A1 | 1/2012 |
| WO | 2012143836 A1 | 10/2012 |

OTHER PUBLICATIONS

Izquierdo, Ebroul et al "Image-Based Rendering and 3D Modeling: A Complete Framework", Signal Processing: Image Communication vol. 15, 2000, pp. 817-858.

Redert, P.A. et al "Synthesis of Multi Viewpoint Images at non-intermediate positions", Proceedings of International Conf. on Acoustics, Speech, and Signal Processing. vol. IV, pp. 2749-2752. 1997.

* cited by examiner

METHOD OF ENCODING A VIDEO DATA SIGNAL FOR USE WITH A MULTI-VIEW STEREOSCOPIC DISPLAY DEVICE

CROSS-REFERENCE TO PRIOR APPLICATIONS

This application is the U.S. National Phase application under 35 U.S.C. §371 of International Application No. PCT/IB2014/058564, filed on Jan. 27, 2014, which claims the benefit of U.S. Provisional Patent Application No. 61/821,750, filed on May 10, 2013 and European Patent Application Nos. 13154244.1 and 13154257.3, filed on Feb. 6, 2013. These applications are hereby incorporated by reference herein.

FIELD OF THE INVENTION

The present invention relates to a method of encoding a video data signal for use with a multi-view stereoscopic display device, a method of decoding a video data signal, a video data signal, an encoder of a video data signal for use with a multi-view stereoscopic display device, a decoder of a video data signal, a computer program product comprising instructions for encoding a video data signal and a computer program product comprising instructions for decoding a video data signal.

BACKGROUND OF THE INVENTION

Over the last two decades three-dimensional display technology has matured. Three-dimensional (3D) display devices add a third dimension (depth) to the viewing experience by providing each of the viewer's eyes with different views of the scene that is being watched.

As a result we now have various ways to view three-dimensional image/video signals. On the one hand we have glasses based three-dimensional display system where a user is presented with distinct images for her/his left eye and right eye. On the other hand we have auto-stereoscopic three-dimensional display systems that provide the un-aided eye of a viewer with a three-dimensional view of a scene.

In glasses-based systems the active/passive glasses provide a filter for separating the distinct images as presented on the screen for the respective eye of the viewer. In glasses-free or auto-stereoscopic systems the devices quite often are multi-view displays that use light directing means, e.g. in the form of a barrier or lenticular, to direct a left image to the left eye and a right image to the right eye In order to provide content for use with stereoscopic multi-view display devices, various input formats have been designed over time. An example of such a format can be found in the published PCT application WO2006/137000 (A1). This document discloses an image exchange format for image and depth information in combination with further information such as depth and/or occlusion depth. Information provided in this manner may be used to render images for use with auto-stereoscopic multi-view displays based on lenticular or barrier technology.

The article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 discloses a method of extracting depth information and of rendering a multi-view image on basis of the input image and the depth map.

In order to improve the results of the aforementioned image based rendering techniques various techniques have been devised that make use of additional occlusion texture and occlusion depth as disclosed in WO2006/137000(A1). The addition of an occlusion texture and an occlusion depth map however are relatively costly in that it may require the transmission of an additional image and depth map for use in rendering.

Apart from adding additional image data in the form of further image and depth maps, it is also known that additional metadata can be provided in order to improve the quality of the image based rendering. An example of such metadata is provided in PCT application WO2011/039679 (A1). This document discloses a method of encoding a video data signal providing a preferred rendering direction indicator for use in rendering further views.

OBJECT OF THE INVENTION

The inventors have observed that merely encoding a rendering direction indicator can be further improved upon in particular when considering the rendering of image and depth based content for stereoscopic multi-view displays.

SUMMARY OF THE INVENTION

According to a first aspect of the invention there is provided a method of encoding a video data signal for use with a multi-view stereoscopic display device, the method comprising: providing a first image of a scene as seen from an input viewpoint, providing a depth map associated with the first image, providing preference data comprising an indicator indicative of the preferred position of the center view for use in view rendering, the preferred position of the center view and the input viewpoint being relative to a base-line between a reference left view and a reference right view and generating the video data signal comprising encoded data representing the first image, the depth map and the preference data.

The advantage of encoding a video data signal in this manner is that it allows the decoder that is going to use the content for rendering views for a multi-view display to select an appropriate center view for the corresponding viewing cone. As a result it is possible to select a perceptually pleasing, i.e. preferred, center position for the viewing cone of the display device, in a manner that is independent of the target display.

In this application reference is made to a center view. A multi-view stereoscopic display device is arranged for view rendering of a viewing cone having multiple views, a center view being at a center position of the viewing cone. It is noted that multi-view stereoscopic displays exist having an odd number of views as well as multi-view stereoscopic displays having an even number of views. In case of a multi-view stereoscopic display the center view corresponds to the middle view in the viewing cone; i.e. typically the view that is perpendicular to the display panel. The center view in case of an even number of views corresponds with the position in the middle between the two views closest to the center of the viewing cone.

Optionally the preference data comprises an indicator indicating the preferred position of the center view position for use in rendering images for display on the multi-view stereoscopic display.

Optionally, the preference data comprises preference data in dependence of the relation of the input viewpoint to the baseline, comprising, for a video signal having only a single view constituting the input viewpoint, where the reference left view and the reference right view represent an intended left view position and an intended right view position relative to the single view, a single view center offset value provided as said indicator indicating the preferred position relative to the single view. The preference data may further comprise a single view center offset flag which is set when the single view center offset value is provided.

Optionally, the preference data (30) comprises preference data in dependence of the relation of the input viewpoint to the baseline, comprising, for a video signal having a left view and a right view constituting the reference left view and the reference right view, a single view processing center offset value provided as said indicator indicating the preferred position relative to a center position between the left and right view. The preference data may further comprise at least one of:

a single view processing center offset flag being set when a single view processing center offset value is provided;

a single view preferred flag being set when single view processing is preferred;

a preferred view indicator indicating that the left view is the preferred view for single view processing or that the right view is the preferred view for single view processing.

Optionally the preference data indicates the preferred position of the center view position relative to the baseline between the reference left view and the reference right view with an accuracy of a $1/100^{th}$ of the baseline, in this manner a compromise between accuracy and storage requirements is achieved.

Optionally the preference data indicates the preferred position of the center view position by means of an offset value relative to the center between the left reference view and the right reference view and wherein an offset value of zero corresponds with the input viewpoint. In this manner the representation of the center position can be a singular value that relates the chosen input to the input viewpoint, and the target preferred position for use in rendering.

Optionally the preferred position of the center view is determined based on an assessment of perceived image quality after rendering content for a plurality of different center view positions for a reference display. In this manner a perceptually pleasing center position can be chosen, such that e.g. the errors resulting from de-occlusion can be ameliorated or substantially reduced, but also keeping track of possible other authoring considerations. For example, consider a scene where a person stands in front of a white wall on one side, and in front of a highly textured curtain on the other side. By choosing the rendering in a particular direction the occlusion artefacts resulting from the de-occlusion of the curtain can be reduced. However, if the person in the scene is looking out the window extending the scene too far in that direction may become annoying; in that a significant region of interest of the window may be affected.

A method according to this embodiment allows such situation to be detected and allows a compromise to be selected that can be properly rendered on an autostereoscopic multi-view display.

Optionally, the preference data is set for one of per frame, per group of frames, or per shot/scene. As changes in the center viewpoint within a scene may be uncalled for, it is possible to set the preference data on a per frame basis, on a group of frame basis or on a shot or scene basis. The latter in practice appears to be the least intrusive. Moreover if so required; the per-frame encoding of the preference data, either directly by including data updates for every frame or indirectly e.g. by indicating a set of preference data increments for a number of subsequent frames or by setting a target value for a certain frame in the future, would allow a smooth transition of the preference data over time.

According to a second aspect of the invention there is provided a method of decoding a video data signal, the video data signal comprising encoded data representing: a first image of a scene as seen from an input viewpoint, a depth map associated with the first image, preference data comprising an indicator indicative of the preferred position of the center view for use in view rendering, the preferred position of the center view and the input viewpoint being relative to a base-line between a reference left view and a reference right view, the method comprising: acquiring the video data signal, rendering multiple views based on the first image and the depth map and the preference data such that the rendered views are coincident with or around the preferred position of the center view as encoded in the video data signal.

In a preferred embodiment the method of decoding further involves subsequently weaving the rendered views for use of driving a target stereoscopic multi-view display.

According to a third aspect of the invention, there is provided a video data signal the video data signal comprising encoded data representing: a first image of a scene as seen from an input viewpoint, a depth map associated with the first image, preference data comprising an indicator indicative of a preferred position of the center view for use in view rendering, the preferred position of the center view and the input viewpoint being relative to a base-line between a reference left view and a reference right view.

Optionally, the preference data further includes preferred positions of multiple views, relating the preferred position of the respective view to the input viewpoint and the base-line between the reference left view and the reference right view.

According to a fourth aspect of the invention, there is provided a data carrier for comprising the video data signal in a non-transitory form, wherein the data carrier may vary from known devices such as an optical disc, a hard disk drive, a solid state drive, or a solid state memory.

According to a fifth aspect of the invention, there is provided an encoder for encoding a video data signal for use in a multi-view stereoscopic display device, the encoding comprising: a first acquisition unit for providing a first image of a scene as seen from an input viewpoint, a second acquisition unit for providing a depth map associated with the first image, a third acquisition unit for providing preference data comprising an indicator indicative of the preferred position of the center view for use in view rendering, the preferred position of the center view and the input viewpoint being relative to a base-line between a reference left view and a reference right view and a generator arranged to generate the video data signal comprising encoded data representing the first image, the depth map and the preference data.

According to a sixth aspect of the invention, there is provided a decoder for decoding a video data signal, the video data signal comprising encoded data representing: a first image of a scene as seen from an input viewpoint, a depth map associated with the first image, preference data comprising an indicator indicative of the preferred position of the center view for use in view rendering, the preferred position of the center view and the input viewpoint being relative to a base-line between a reference left view and a reference right view, the decoder comprising a de-multiplexer for de-multiplexing the first image data, the depth map and the preference data a view renderer arranged to render multiple views based on the first image and the depth map and the preference data such that the rendered views are coincident with or around the preferred position of the center view as encoded in the video data signal.

Optionally the decoder is further arranged to render mutually equidistant views for use with the multi-view display based on the preferred center position and the amount of disparity that is available for rendering Optionally the preference data further includes preferred positions of all views of the target display, relating the preferred position of the respective view to the input viewpoint and the base-line between the reference left view and the reference right view.

According to a seventh aspect of the invention, there is provided a computer program product comprising instructions for causing a processor system to perform an encoding method according to the invention.

According to an eighth aspect of the invention, there is provided a computer program product comprising instructions for causing a processor system to perform a decoding method according to the invention.

These and other aspects of the invention are apparent from and will be elucidated with reference to the embodiments described hereinafter.

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF THE INVENTION

Before turning to the invention we first introduce the concept of viewing cones as they are found commonly on multi-view autostereoscopic displays. For a particularly advantageous form of such a multi-view display reference is made to U.S. Pat. No. 6,801,243 B1, which shows an example of a lenticular-based multi-view autostereoscopic display.

Figure 1A:
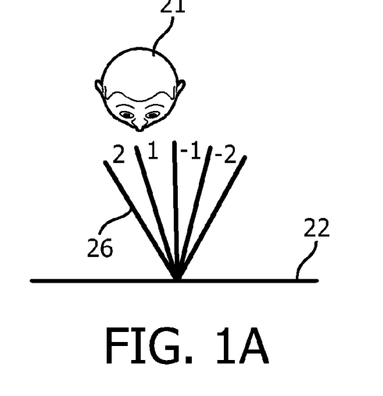
FIG. 1A shows a simplified viewing cone representation of a stereoscopic 4-view multi-view display.

FIG. 1A, shows a simplified viewing cone representation of a stereoscopic 4-view multi-view display, the viewing cone 26 illustrates the views that a viewer will see. When the viewer sits in front of the display panel at the center of the display panel (not shown) the viewer will perceive with his left eye view −1 and with his right eye view 1. By providing a properly rendered view; i.e. a view rendered for the left eye and one rendered for the right eye, the viewer 21 will perceive a stereoscopic image. However, when the viewer 21 moves a long a line parallel to the display plane to his right towards the position as shown in FIG. 1A then the viewer will perceive the views 1 and 2. This implies that the views 1 and 2 also need to represent views of a stereo-pair. In the situation as shown in FIG. 1A the viewing cone of the display device is centered around the point in the middle between the views −1 and 1. That is the views are said to be centered around a "virtual" view 0, here the view is said to be virtual because the display does not show this view.

Figure 1B:
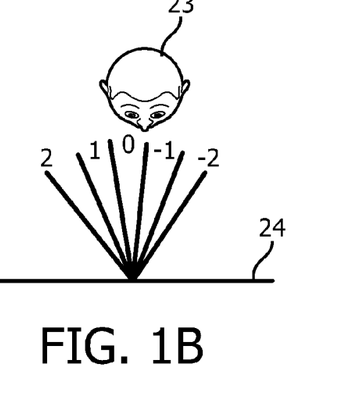
FIG. 1B shows a simplified viewing cone representation of a stereoscopic 5-view multi-view display.

FIG. 1B shows a simplified viewing cone representation of a stereoscopic 5-view multi-view display. The viewer 23 is facing the display panel 24, which may e.g. be overlaid with a slanted lenticular foil or a switchable barrier so as to direct the 5 views that original from the display panel in 5 distinct directions as shown in FIG. 1B. The right eye of viewer 23 is positioned facing the display panel in the middle of the display panel as a result view 0, which is directed at an angle perpendicular to the display screen, is visible to the right eye of viewer 23. Likewise view −1 is visible to the left eye of the viewer 23. In the case as shown in FIG. 1B, the views are said to be centered around view 0 which is positioned at the center of the viewing cone.

Figure 2:
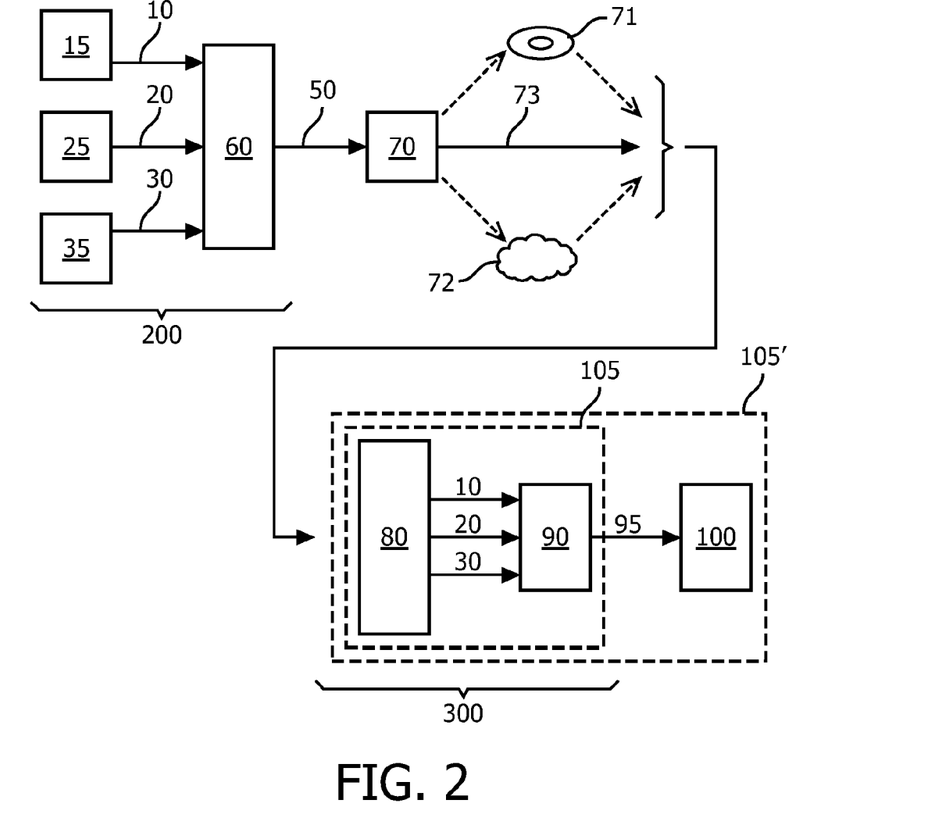
FIG. 2 shows a block diagram of an encoder and decoder according to the invention.

FIG. 2 shows a block diagram of an encoder 200 and decoder 300 according to the invention. Encoder 200 presented on the left hand side of the figure prepares a video data signal 50 that is subsequently transmitted by the transmitter 70. The transmitter 70 can be embodied by a recording device for recording the video data signal 50 onto a data carrier, as mentioned hereinbefore, or alternatively can prepare the video data signal for transmission over a wired 73 or wireless 72 medium or a combination of both (not shown).

The transmitted data is received at the decoder 300 depicted on the right hand side. The decoder 300 receives the video data signal and de-multiplexes the content and uses this to render views on a rendering unit 90. As indicated in the figure the decoder can be can be embodied in a device 105 that drives an external multi-view stereoscopic display, or the decoder can be embodied in a device 105' that also comprises the multi-view stereoscopic display.

The decoder functionality of device 105 may e.g. be implemented in a set top box, where the display device is driven using e.g. a HDMI, DVI or DisplayPort style interface, well known to those skilled in the art. Alternatively the decoder functionality may be implemented on a laptop, tablet or smartphone that transmits the rendered and interleaved video content over a Wireless HD or WiGiG interface.

In more detail FIG. 2 shows, the encoder 200 for encoding a video data signal 50 for use with a multi-view stereoscopic display device 100, the encoder comprising a first acquisition unit 15 for acquiring a first image 10 of a scene as seen from an input viewpoint, a second acquisition unit 25 for acquiring a depth map 20 associated with the first image 10, a third acquisition unit 35 for acquiring preference data 30 indicative of the preferred position of the center view for use in view rendering based on the first image and the depth map. The preferred position of the center view relating the input viewpoint to a base-line between a reference left view and a reference right view. The acquisition units may be arranged to read the inputs for the encoder from a storage means or from a network.

Once acquired, a generator 60 is arranged to generate the video data signal 50 comprising encoded data representing the first image 10, the depth map 20 and the preference data 30. The input data may be encoded in one or more streams that are subsequently multiplexed into the video data signal 50.

Likewise FIG. 2, shows a decoder 300 for decoding a video data signal 50, that is received from a wired network 73, a wireless network 72 or possibly read from a data carrier 71. The video data signal 50 comprises encoded data representing: a first image 10 of a scene as seen from an input viewpoint, a depth map 20 associated with the first image 10, preference data 30 indicative of the preferred position of the center view for use in view rendering based on the first image and the depth map, the preferred position of the center view relating the input viewpoint to a base-line between a reference left view and a reference right view. The decoder shown comprises a de-multiplexer 80 for de-multiplexing the first image data 10, the depth map 20 and the preference data 30 for further processing. Next a view renderer 90 is arranged to render multiple views based on the first image 10 and the depth map 20 and the preference data 30 such that the rendered views are rendered coincident with or around the preferred position of the center view as encoded in the video data signal 50.

It is noted here that when views are rendered for a display with an odd number of views is being rendered the rendered center view will be coincident with the preferred position as indicate by the preference data 30 and the other views will be positioned symmetrically around the preferred position of the center view. Likewise, when views are rendered for a display with an even number of views all views will be positioned symmetrically around the preferred position of the center view and the two views closest to the preferred position will be positioned symmetrically around the preferred position.

Encoding Preference Position in Video

In current video data signal encoding systems that use a first image and an associated depth map the actual video data is quite often encoded based on either the AVC specification or the HEVC specification.

In such systems the depth information is often used by the display device that attempts to render the video data signal in combination with the video and applicable metadata to create views that are not directly available from the coded video sequence(s). Depth may or may not be present in the coded data stream. If there is no depth present in the coded video sequence(s), depth maps may be generated from the video by the display device.

In the cases that depth is present, it has to be coded in a form that the display device can decode. Although most of the examples provided herein shows video that consists of monoscopic video (1-view), the present invention may also be used with stereoscopic video (2-view) when only one of the views is used for rendering the views. In the case of stereoscopic video, depth may be provided for both views or for one of the two views.

Image and depth information may be packaged in a number of formats. One such format is the format as presented hereinabove in WO2006/137000(A1). Alternatively the data could be packaged in another frame compatible 2D video and depth format.

In the frame compatible 2D video and depth coding, 2D video and associated depth maps are packed in one of several possible ways into coded video frames. For example, in a side-by-side configuration the video may be horizontally subsampled by a factor of 2 and be placed at the left half of the picture, while the related depth is coded in the luminance of the right half of the picture. The main advantages of this method are that standardized AVC/HEVC transport channels are available for distribution and that AVC/HEVC decoders can be used for decoding. Video and depth may be included in a single AVC or HEVC video stream such that at the decoder each frame of the decoded picture contains scaled versions of 2D video and the associated depth (Z). Formats such as side-by-side and top-bottom are foreseen.

Alternatively the amount of depth information may be further reduced through further scaling or subsampling vertically and/or horizontally, thereby creating more bandwidth for the The depth maps in turn may be encoded e.g. using 8-bit or 16-bit values. In case of 8-bit this would represent the range from 0 to 255 inclusive. When the depth maps are stored in the part of an area of the picture, the depth values are stored in the luma samples of the pixels in the area of the picture that is designated for storing depth.

The preference data 30 represents metadata that is provided in addition to the image and depth information to improve the quality of rendering. Such metadata may be included in SEI messages in AVC or HEVC based coded video sequences. Preferably such metadata is contained in user data unregistered SEI messages. These metadata SEI messages are included in the elementary stream that contains the depth. This can be the single elementary stream with video and depth or a separate depth elementary stream, depending on the selected format.

TABLE 1

Metadata SEI message container syntax

| | C | Descriptor |
|---|---|---|
| user_data_unregistered( payloadSize ) { | | |
| ... | 5 | u(8) |
| metadataSize = payloadSize − 17 | | |
|   if( metadata_type == 0 ) | | |
|     depth_processing_information( | | |
|     metadataSize) | | |
|   else if( metadata_type == 1 ) | | |
|     view_rendering_assist_information( | | |
|     metadataSize) | | |
|   else | | |
|     for( i = 0; i < metadataSize; i++ ) | | |
|       reserved_metadata_byte | 5 | b(8) |
| } | | |

Metadata may be included in the coded video sequence by means of one or more user data unregistered SEI messages that are uniquely identified by means of a 128-bit identifier with a fixed value. Several types of metadata have been defined. Metadata of the same type is contained in a single SEI message for which the type is indicated by the metadata_type field.

Multiple metadata SEI messages may be associated with a single access unit, but at most one metadata SEI message of a certain type may be associated with that access unit.

Table 2 below shows an example syntax of depth_processing information as mentioned in Table 1 above.

TABLE 2

Depth processing information syntax

| depth_processing_information( metadataSize ) { | C | Descriptor |
|---|---|---|
| ... | | |
| depth_coding_format | 5 | u(4) |
| dual_depth | 5 | u(1) |
| preferred_view | 5 | u(2) |
| single_view_preferred | 5 | u(1) |
| ... | | |
| single_view_processing_center_offset_flag | 5 | u(1) |
| single_view_center_offset_flag | 5 | u(1) |
| ... | | |
| if(single_view_processing_center_offset_flag) { | | |
|   i = i + 1 | | |
|   single_view_processing_center_offset | 5 | i(8) |
| } | | |
| if(single_view_center_offset_flag) { | | |
|   i = i + 1 | | |
|   single_view_center_offset | 5 | i(8) |
| } | | |
| ... | | |
| } | | |

A further explanation of the various elements follows below.

depth_coding_format may be used to indicate which particular depth coding format is being used when multiple depth_coding formats are available.

dual_depth represents a flag that indicates whether in case of stereo content, one or two depth maps are provided, a value of 1 indicates two depth maps are provided. Notably when only a single depth map is available the present invention may be used to render additional views based on the view associated with the single depth map.

preferred_view, when the preferred_view is set to 1 this indicates that the left view is the preferred view for single view processing by the display. This field set to 2 indicates that the right view is the preferred view for single view processing by the display.

This value is particularly relevant for display devices that are designed to generate views from a single view. For display devices that are capable of using multiple views for view generation, preferred_view indicates the best view for view rendering when single_depth_preferred is set to 1.

If dual_depth is 0 or when there is no preferred view, this field shall be set to 0.

single_view_preferred, when this is set to 1, it indicates that single view processing by the display device is preferred. If dual_depth is 0, this field shall be set to 0.

Single_view_processing_center_offset contains an integer value that specifies the recommended position of the rendered center view for multiview display devices that do not utilize the dual depth information. This field may only be present when dual_depth is set to 1. The single_view_processing_center_offset_flag is set when the value for single_view_processing_center_offset is provided, as indicated by the conditional "if" function in table 2.

The center offset parameters contain values in the range from −128 to 127, inclusive, and are relative to an exact center position (representing offset value equal to 0) between a left and right view in units of $\frac{1}{100}$ of the baseline between the left and right view. Values are increasing with positions from left to right; with −50 representing the original left view position and 50 representing the original right view position.

single_view_center_offset contains an integer value that specifies the recommended position of the rendered center view for multiview display devices. This field may only be present when dual_depth is set to 0 or when single_view_preferred is set to 1. The single_view_center_offset_flag is set when the value for single_view_center_offset is provided, as indicated by the conditional "if" function in table 2.

The single view center offset parameter contains values in the range from −128 to 127, inclusive, and are relative to the provided view (representing offset value equal to 0) in units of $\frac{1}{100}$ of the baseline between the intended left and right view. Values are increasing with positions from left to right; with −50 representing the intended left view position and 50 representing the intended right view position.

Although the present invention has been describe with reference to a video data signal that comprises a first image, a depth map and preference data, this does not preclude the presence of other data in the video data signal. For example the present invention may be used to full effect when rendering content that is provided as a left image and a left depth map, a right image and a right depth map. Although it may often be possible to achieve better rendering result using both the data from left and right, this may not always be the case.

As a result even in a situation where there is stereo data available and two depth maps it may be possible to render multiple views based on the first image and the associated depth map only, rather than using the right image and the right depth map.

Figure 3:
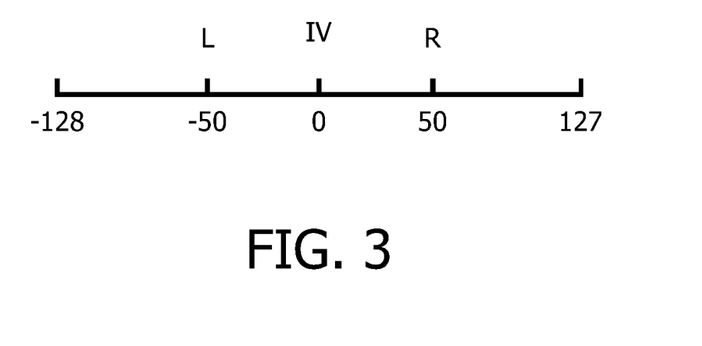
FIG. 3 shows a schematic overview of the preference data representation.

The encoding of the center view position will now be discussed in more detail with reference to the FIGS. 3 and 4. FIG. 3 graphically shows a possible integer encoding of single_view_processing_center_offset or single_view_center_offset value using an 8-bits integer representation. The input viewpoint is mapped onto an offset of 0, whereas an offset of −50 corresponds to the view where normally a left image would be rendered. An offset of 50 corresponds to the view where normally a right view of a stereo pair would be rendered.

The underlying idea behind this encoding is that all multi-view displays will need to be able to render stereoscopic content in such a manner that the total amount of parallax that can be rendered; i.e. the difference in parallax between the leftmost view and the right most view needs to be used to render video content in an acceptable manner for a viewer.

As a result a good quality auto-stereoscopic display device will need to be able to render stereoscopic content, where there is a left and a right view. The inventors of the present invention have realized that this characteristic can be used to define an offset in terms of the baseline of stereoscopic content. As a result a single definition can be used for a wide range of multi-view stereoscopic display devices. In such a situation the base line can be chosen to match the baseline as used for shooting the stereoscopic content.

Reference Left View and Reference Right View

However, when rendering based on a single image and associated depth the same problem can arise; that is we need to define a baseline for allowing the placement of the center position in order to improve the rendering of the views. However, in such a case there is no strict definition of a left image and a right image.

The inventors have realized that for this reason it may be beneficial to define a left reference view and a right reference view on the baseline and to define the center position based thereon. Although this does address the problem of being able to properly select the position of the base line this does shift the problem to the definition of the left and right reference views.

The inventors have realized that different methods can be used for doing so. A first approach to do this is to define the base line based on a property of the display device itself. For example the baseline could be defined as corresponding to the base line used by the device when rendering image+depth based content for the center views. In case of an even number of views this corresponds to the baseline corresponding to the two views closest to the virtual viewing cone center. In this manner a value of −50 would match the center position of the left view of the center most view-pair in the viewing cone. In this situation the reference left view would match the left view of the center most view pair in the viewing cone.

Alternatively, the base line could be defined based on the left most and right most view of the viewing cone. In such a scenario, −50 would correspond with the left most view of the viewing cone.

More alternatively, the baseline could be defined based on metadata that is related to the on-screen disparity of a view; i.e. based on the display screen size, the preferred viewing distance, and the eye distance of the viewer.

Even more alternatively if the display also supports stereoscopic content, then it is possible to select the left stereo view as the left reference view and the right stereo view as the right reference view. In multi-view autostereoscopic displays that render stereo content the amount of disparity between left and right is typically divided over multiple views; that is the amount of disparity between two views of the viewing cone is considerably less than that of the stereo input content.

However, it is possible to use the base line as defined by the original stereo left and right view for defining the center.

As will be clear to those skilled in the art many different definitions are possible all based on the same concept; a left and right reference view is defined and the center is defined as a fraction of the baseline between these two views.

In fact which particular type of reference view definition is chosen can be pre-defined or could alternatively be encoded as metadata in the video data signal itself.

Referring again to FIG. 3, an offset of −50 implies that all the views that the display will render will be centered around what would be the position where such a multi-view stereoscopic display device would render a left image of a stereoscopic image pair without offset. Likewise an offset of 50 implies that all the views that the display will render will be centered around what would be the position where such a multi-view stereoscopic display device would render a right image of a stereoscopic image pair without offset.

Figure 4:
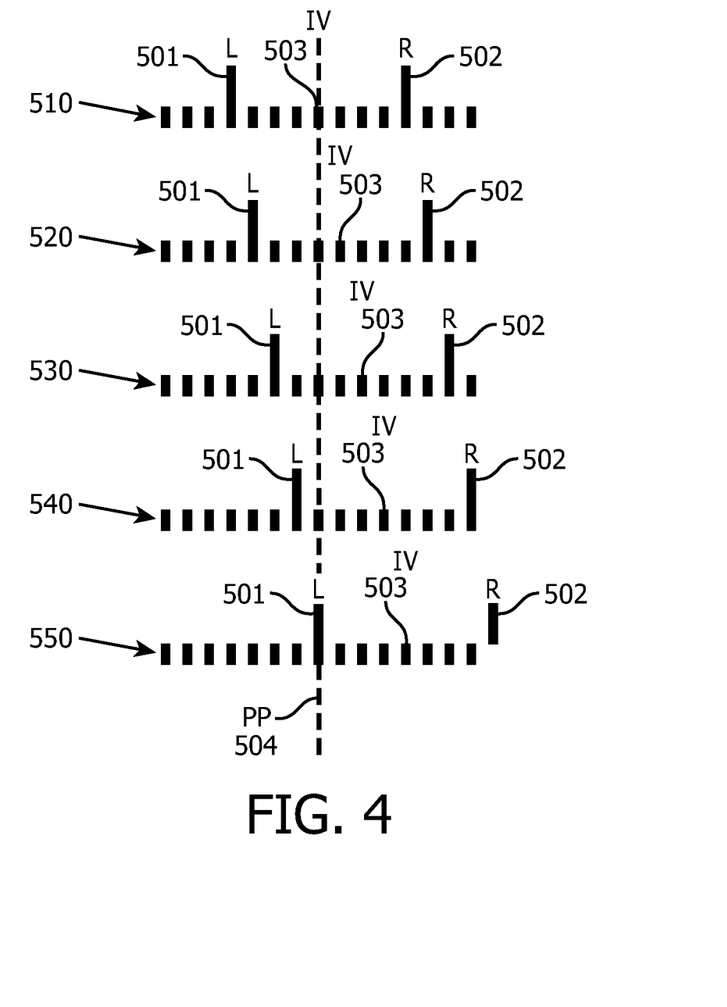
FIG. 4 shows a schematic overview of possible rendered views based on preference data.

FIG. 4 shows a series of example for view placements of 15 views 510-550, relative to the position of the left image 501 and right image 502 of a stereo pair. The input viewpoint (IV) 503 indicates the position of the input view point relative to the preferred position (PP) 504 of the center view of the viewing cone.

The view placement 510 corresponds with an offset of 0 that is the situation wherein the preferred position 504 overlaps the input view 503. Likewise the view placement 520 corresponds with an offset of −12 (approximating 12.5%). The view placement 530 in turn corresponds with an offset of −25, the view placement 540 corresponds with an offset of −37 (approximating 37.5%) and the view placement 550 corresponds with an offset of −50; that is the situation where the center view overlaps with the position where normally the left image of a viewing pair would be rendered.

Notably the offset specification as proposed here also allows target display devices to fully control the placement of the individual views in the viewing cone. This is particularly advantageous as different multi-view stereoscopic display devices may have different ways of assigning views. FIG. 4 for example shows an equidistant view positioning, wherein the parallax between adjacent views remains the same, however alternatively it may be possible to reduce the parallax between views towards the sides of the viewing cones so as to sway people to move towards the center of the viewing cone where parallax is highest.

Figure 5:
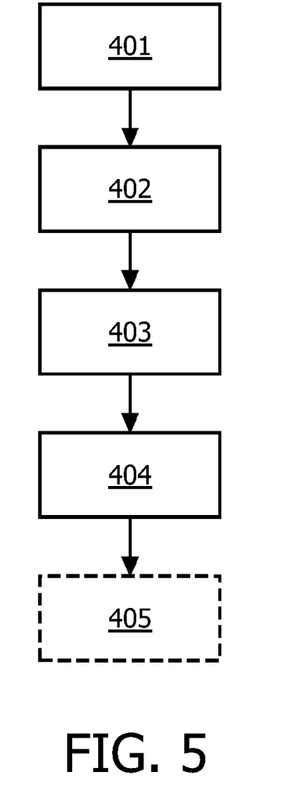
FIG. 5 shows a flow-chart of an encoding method.

Turning to FIG. 5, FIG. 5 shows a flow-chart of a method of encoding a video data signal 50 for use with a multi-view stereoscopic display device 100, the method comprising: a step of providing 401 a first image 10 of a scene as seen from an input viewpoint, a second step of providing 402 a depth map 20 associated with the first image 10, a step of providing 403 preference data 30 indicative of the preferred position of the center view for use in view rendering based on the first image and the depth map, the preferred position of the center view relating the input viewpoint to a base-line between a reference left view and a reference right view and a step of generating 404 the video data signal 50 comprising encoded data representing the first image 10, the depth map 20 and the preference data 30.

As indicated optionally the method further comprises weaving 405 the rendered view for use in driving a target stereoscopic multi-view display 100. More information on view weaving may e.g. be found in U.S. Pat. No. 6,801,243 B1.

Figure 6:
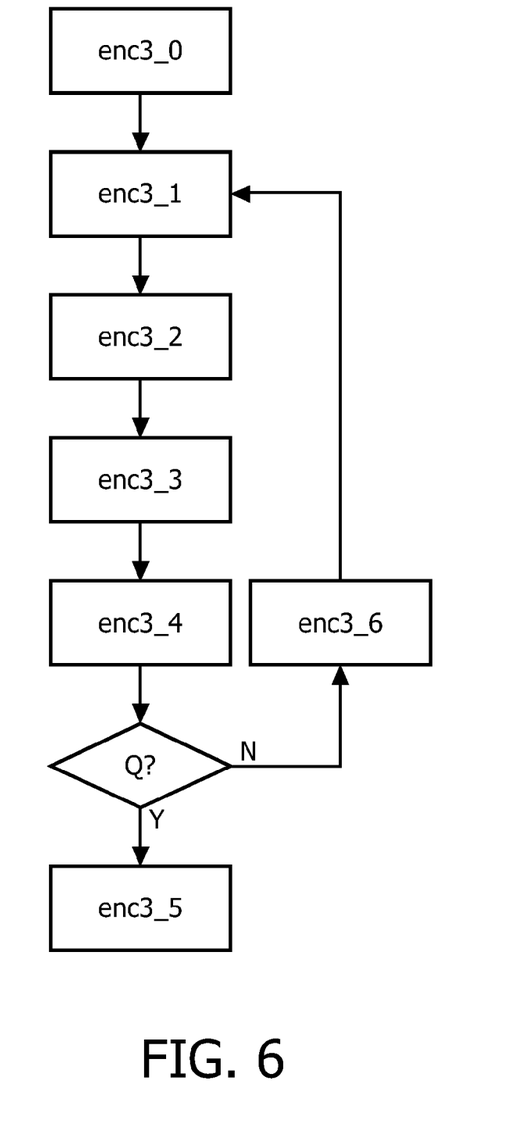
FIG. 6 shows a detail of a flow-chart of a preferred method of selecting the preferred position.

Turning to FIG. 6, FIG. 6 shows a flow-chart for use in establishing the preferred position of the center view. The process presented here may be followed in order to acquire preference data (30). In step enc3_0 a set of offsets is determined for rendering. Next an unevaluated offset is selected in step enc3_1, subsequently in step enc3_2 views are rendered for the first image and associated depth map using this offset setting. In step enc3_3 the rendered views are weaved and displayed. Next in step enc_3_4 the displayed views are ranked, either by means of human assisted ranking or by means of a machine based ranking approach; for example by determining and evaluating a metric for the amount of de-occlusion near highly textured structures.

Next at the step Q?, it is evaluated whether all offsets have been ranked if not the process continues at step enc_0 otherwise the process continues with step enc3_5 where the best ranking offset is selected which is used to generate the preference data 30.

Figure 7:
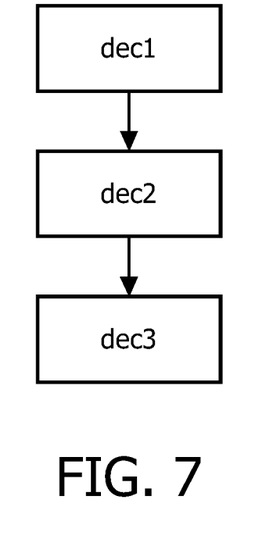
FIG. 7 shows a flow-chart of a decoding method.

Turning to FIG. 7, FIG. 7 shows flow-chart of a method of decoding a video data signal 50, the video data signal 50 comprising encoded data representing: a first image 10 of a scene as seen from an input viewpoint, a depth map 20 associated with the first image 10, preference data 30 indicative of the preferred position of the center view for use in view rendering based on the first image and the depth map. The preferred position of the center view relating the input viewpoint to a base-line between a reference left view and a reference right view. The method comprising: a step dec1 of acquiring the video data signal 50, this may be reading the video data signal from a memory, a hard disk storage, or receiving the data from a wired or wireless network.

Next the video data signal is de-multiplexed in step dec2 whereby the individual components as comprised in the video data signal 50 are extracted, for example by de-multiplexing the container format of the incoming video stream and/or by subsequent de-multiplexing of the elementary streams comprised therein. Notably such a de-multiplexing step may not always be necessary and is dependent on the input format of the video data signal that is decoded.

After decoding a step of rendering dec3 is applied wherein multiple views 95 are rendered based on the first image 10 and the depth map 20 and the preference data 30 such that the rendered views 95 are rendered coincident with or around the preferred position of the center view as encoded in the video data signal 50.

As will be clear to those skilled in the art, depth is roughly inversely proportional to disparity, however the actual mapping of depth to disparity in display devices is subject to various design choices such as, the total amount of disparity that may be generated by the display, the choice of allocating a particular depth value to zero disparity, the amount of crossed disparity allowed, etc. However, the depth data which is provided with the input data is used to warp images in a depth dependent manner. Therefore disparity data is here qualitatively interpreted as depth data.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines.

Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically.

Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of encoding a video data signal for use in a multi-view stereoscopic display device, wherein the multi-view stereoscopic device is arranged for view rendering of multiple views from a display screen, the method comprising:
   providing a first image of a scene as seen from an input viewpoint, the input viewpoint being relative to a base-line between a reference left view and a reference right view,
   providing a depth map associated with the first image,
   providing preference data comprising an indicator, wherein the indicator is indicative of a preferred position relative to the base-line of a center view at a center position in a viewing cone for use in view rendering based on the first image and the depth map, and
   generating the video data signal comprising encoded data representing the first image, the depth map and the preference data for enabling the device to render the views,
   wherein said rendering comprises rendering the views coincident with or around the preferred position of the center view, the center view being directed at an angle perpendicular to the display screen.

2. The method of claim 1, wherein the preference data comprises preference data in dependence on the relation of the input viewpoint to the base-line, wherein the video signal has only a single view constituting the input viewpoint, where the reference left view and the reference right view represent an intended left view position and an intended right view position relative to the single view, wherein the indicator is a single view center offset value.

3. The method of claim 2, wherein the preference data comprises a single view center offset flag, wherein the single view offset flag is set when the single view center offset value is provided.

4. The method of claim 1, wherein the preference data comprises preference data in dependence of the relation of the input viewpoint to the base-line, wherein the video signal has a left view and a right view constituting the reference left view and the reference right view, wherein a single view processing center offset value is provided as the indicator.

5. The method of claim 4, wherein the preference data comprises at least one of: a single view processing center offset flag being set when a single view processing center offset value is provided; a single view preferred flag being set when single view processing is preferred; and a preferred view indicator, wherein the indicator indicates that the left view is the preferred view for single view processing or that the right view is the preferred view for single view processing.

6. The method of claim 1, wherein the preference data indicates the preferred position of the center view position relative to the base-line with precision of $\frac{1}{100}^{th}$ of a distance between the reference left view and the reference right view.

7. The method of claim 1, wherein the preferred position of the center view is determined based on an assessment of image quality after rendering content for a plurality of different center view positions for a reference display, and/or wherein the preference data is set for one of: per frame; per group of frames; and per scene.

8. A method of decoding a video data signal for use in a multi-view stereoscopic display device, the video data signal comprising encoded data representing: a first image of a scene as seen from an input viewpoint, the input viewpoint being relative to a base-line between a reference left view and a reference right view, a depth map associated with the first image, preference data comprising an indicator, wherein the indicator is indicative of a preferred position relative to the base-line of a center view at a center position of a viewing cone for use in view rendering based on the first image and the depth map, the method comprising:
    acquiring the video data signal, rendering multiple views using a display screen based on the first image and the depth map and the preference data, wherein the stereoscopic display device is arranged for viewing a rendering of multiple views using a display screen
    wherein said acquiring the video data signal comprises acquiring the preferred position of the center view as encoded in the video data signal, and
    the rendering comprises rendering the views coincident with or around the preferred position of the center view, the center view being directed at an angle perpendicular to the display screen.

9. A non-transitory computer-readable medium that includes a video data signal for use in a multi-view stereoscopic display device, wherein the multi-view stereoscopic display device is arranged for viewing a rendering of multiple views from a display screen, the video data signal comprising encoded data representing:
    a first image of a scene as seen from an input viewpoint, the input viewpoint being relative to a base-line between a reference left view and a reference right view,
    a depth map associated with the first image,
    preference data comprising an indicator, wherein the indicator is indicative of a preferred position relative to the base-line of a center view at a center position of a viewing cone for use in view rendering based on the first image and the depth map,
    wherein the preferred position of the center view is relative to the base-line for enabling the device to render views coincident with or around the preferred position of the center view, the center view being directed at an angle perpendicular to the display screen.

10. The medium of claim 9, wherein the preference data further includes preferred positions of multiple views, relating the preferred position of the respective view to the input viewpoint and the base-line between the reference left view and the reference right view.

11. An encoder device for encoding a video data signal for use in a multi-view stereoscopic display device, wherein the multi-view stereoscopic device is arranged for viewing a rendering of multiple views from a display screen, the encoder device comprising:
    a first processor circuit that provides a first image of a scene as seen from an input viewpoint, the input viewpoint being relative to a base-line between a reference left view and a reference right view,
    a second processor circuit that provides a depth map associated with the first image,
    a third processor circuit that provides preference data comprising an indicator, wherein the indicator is indicative of a preferred position relative to the base-line of a center view at a center position of a viewing cone for use in view rendering based on the first image and the depth map, and
    a generator arranged to generate the video data signal comprising encoded data representing the first image, the depth map and the preference data for enabling the device to render the views,
    wherein the rendering comprises rendering the views coincident with or around the preferred position of the center view, the center view being directed at an angle perpendicular to the display screen.

12. A decoder device for decoding a video data signal for use in a multi-view stereoscopic display device, wherein the multi-view stereoscopic device is arranged for viewing a rendering of multiple views from a display screen, the video data signal comprising encoded data representing: a first image of a scene as seen from an input viewpoint, the input viewpoint being relative to a base-line between a reference left view and a reference right view, a depth map associated with the first image, preference data comprising an indicator, wherein the indicator is indicative of a preferred position relative to the base-line of a center view at a center position of a viewing cone for use in view rendering based on the first image and the depth map, the decoder comprising:
    a demultiplexer that demultiplexes the first image data, the depth map and the preference data, and
    a view renderer that renders the multiple views based on the first image and the depth map and the preference data,
    wherein the rendering comprises rendering the views coincident with or around the preferred position of the center view, the center view being directed at an angle perpendicular to the display screen.

13. The decoder device of claim 12, wherein the decoder device is further arranged to render mutually equidistant views.

14. A non-transitory computer-readable medium comprising instructions for causing a processor system to perform the method according to claim 1.

15. A non-transitory computer-readable medium comprising instructions for causing a processor system to perform the method according to claim 8.

* * * * *